Jan. 8, 1963   R. E. WAITE   3,072,060
APPARATUS FOR CONTROLLING A FLUID LEVEL
Filed Jan. 29, 1960   2 Sheets-Sheet 1
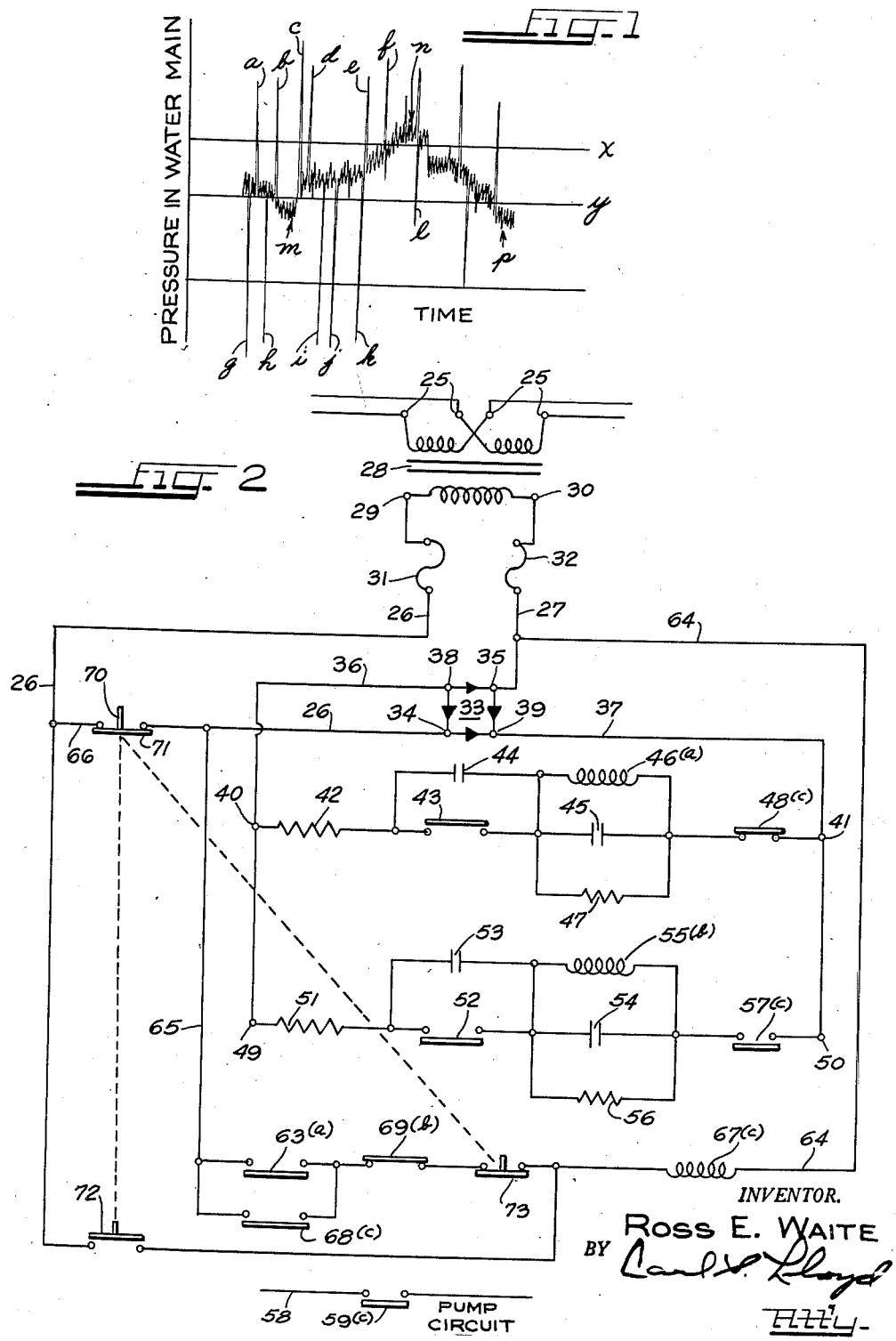
INVENTOR.
ROSS E. WAITE
BY
ATTY.

Jan. 8, 1963 R. E. WAITE 3,072,060
APPARATUS FOR CONTROLLING A FLUID LEVEL
Filed Jan. 29, 1960 2 Sheets-Sheet 2

TO WATER MAIN

INVENTOR.
ROSS E. WAITE
BY
ATTY.

United States Patent Office 3,072,060
Patented Jan. 8, 1963

3,072,060
APPARATUS FOR CONTROLLING A FLUID LEVEL
Ross E. Waite, 1675 Argyle Road, La Salle, Ill.
Filed Jan. 29, 1960, Ser. No. 5,425
16 Claims. (Cl. 103—25)

This invention relates generally to apparatus for controlling the level of a fluid by analyzing the pressure produced by the weight of said fluid and controlling said level in accordance therewith.

More specifically, my invention relates to fluid level control apparatus which will sense the pressure actually produced by the weight of a fluid column and which will, in effect, ignore any pressure surges or impulses present in the fluid system.

The control of the level of water and other fluids in tanks, ponds, lakes and the like has long presented a serious problem. Consider, for example, the problem of accurately controlling the level in a water supply tank which is located several miles from the pumping station. Obviously, it is desirable to maintain such a tank nearly full at all times in order to provide for emergency needs. The usual approach to this problem is to insert a pressure switch in the water main at a point close to the pumping station and to operate the pump in accordance with the pressure in the main. Thus, since the weight of water is 62.4 pounds per cubic foot, each foot of water in the supply tank will produce a pressure in the main of 0.433 pound per square inch (p.s.i.).

Assume, for example, that the water tank is 25 feet in height and contains 6000 gallons per foot so as to have a total capacity of 150,000 gallons. In such a case the pressure in the water main caused by the weight of the water in the tank would be approximately 10.8 p.s.i. if the tank were full. In order to provide adequately for emergency needs, it would be desirable that the water pump associated therewith be started whenever the water level decreases to about 24.5 feet, which would correspond to a pressure in the main of about 10.59 p.s.i. To achieve this type of control it would be necessary to provide control apparatus which would sense a difference of 0.21 p.s.i. in the pressure caused by the weight of the water in the tank.

With the usual type of control system such accuracy would be absolutely impossible and in the usual case the minimum water level might have to be as low as 12.5 feet and thus the pressure switch would be set to start the pump when the pressure in the main decreased to 5.4 p.s.i. and, of course, to stop the pump when the pressure reached 10.8 p.s.i. In such a case the pressure differential would be 5.4 p.s.i. However, even a pressure differential as large as this might not be practical if appreciable surges were present in the system.

The reason why a large pressure differential, i.e. a large difference between the pressure corresponding to the full liquid level and that corresponding to the minimum liquid level, is generally required with an ordinary control system is because of the large surges or inertia pulses that normally exist in a water system. Surges are always present in any such water system. The greatest surges are caused by the pump, particularly during starting and stopping. Also, as the factories and the various other users along the water main open and close their supply valves, surges or pulses are created in the line and these pulses are sensed by the ordinary pressure switch which is unable to distinguish such pulses from a change in pressure caused by a change in the level of the tank. Consequently, an ordinary pressure switch control system will respond to such pulses or surges by rapidly connecting and disconnecting the pump motor so as to short cycle the pump.

For example, if a large factory were to suddenly close its supply valve, a sudden pulse would be created which would cause a high pressure to be recorded by the pressure switch which controlled the starting and stopping of the pump, and such a pulse would cause the pump to be shut down even though the tank might be below its desired minimum level. The pulses in a typical water system may be of a magnitude of 5 to 10 p.s.i., and indeed they may often be on the order of 25 to 50 p.s.i. Obviously, it would be impossible with an ordinary control system to sense accurately a change in the water level of 6 inches (corresponding to a change in pressure of about 0.21 p.s.i.) if pulses of 5 p.s.i. or greater were present in the system and the control apparatus could not distinguish such pulses from the pressure changes produced by changes of the water level in the tank.

Various means have previously been devised in an attempt to solve this problem. One common approach has been to employ an air tank having a snubber therein between the water main and the pressure switch. Thus, the pressure switch is set to start the pump at a pressure corresponding to the desired minimum level in the tank and to shut off the pump at that pressure corresponding to the maximum level. The air tank and snubber serve to isolate the pressure switch from the surges in the system and thus prevent such surges from having any appreciable effect on the pressure recorded on said switch. While snubbing will partially solve the above problem, it has been found that it also greatly reduces the sensitivity of the control apparatus so that close control of the water level is not possible.

Another method which has been employed to combat the effect of surges in a water system has been the use of timing devices which are employed to prevent the pump from being shut off for a predetermined length of time after it has been started. If the pressure in the system has fallen below that corresponding to the desired minimum level and the pump has been started, then according to this method a timing device is employed to maintain the pump in operation for a predetermined time independently of the pressure in the system. By using such a device it is possible to overcome the effect of surges that occur within a certain short period of time after the starting of the pump, which surges would otherwise shut down the pump long before the tank became full. It will be readily evident, however, that such a method is only a partial solution and will not provide overall accurate control.

The only method which has heretofore produced satisfactory results has been the use of telephone or telegraph wires to transmit signals from the tank to the distant pumping station. According to this method the pressure switch is placed inside the tank itself so that said switch is substantially isolated from the surges in the water main and will sense the pressure actually produced by the weight of the water column. Mechanism is employed to convert the signals from the pressure switch to signals which can be transmitted for long distances without loss, and telephone or telegraph wires are employed to transmit such signals to the distant pumping station. This method will provide fairly accurate control but it is very expensive to install and maintain such a control system and thus it does not provide a generally satisfactory solution.

One of the objects of this invention is, therefore, to provide a pressure analyzing apparatus for controlling a fluid level which will provide extremely close and accurate control of said level even though large surges or impulses are present in the system.

Another of my objects is to provide a pressure analyzing apparatus for measuring or controlling a fluid level which is quite inexpensive to manufacture and maintain and which is easily installed and operated.

These and other objects and advantages of the invention will be apparent from the following description thereof, taken in conjunction with the accompanying drawings in which:

FIG. 1 is a graphical representation of typical pressure variations which occur in a fluid system being controlled by the apparatus of my invention;

FIG. 2 is a schematic wiring diagram illustrating one embodiment of my invention;

Figure 3:
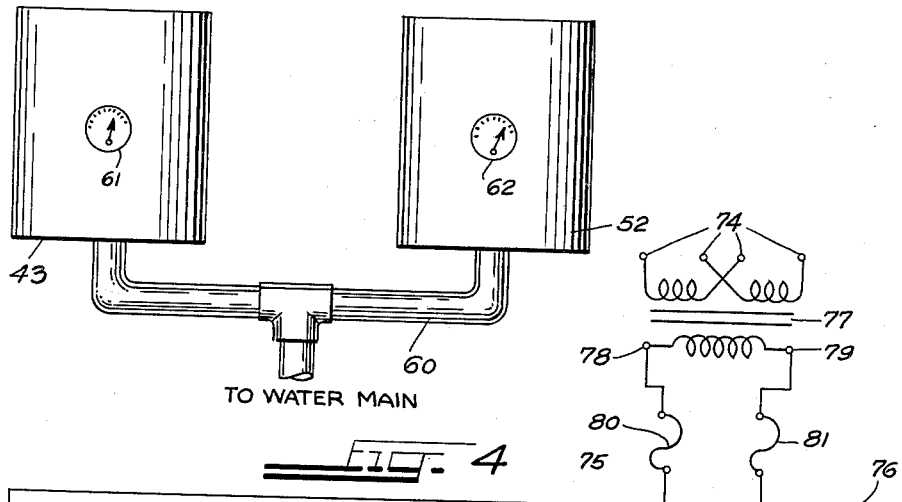
FIG. 3 is an elevational view illustrating the manner in which two pressure switches can be connected to a water main so as to sense the pressure therein.

Before describing in detail a particular embodiment of my invention, it is believed useful to discuss generally some of the basic principles upon which the invention is based. Consider again the problem of controlling the water level in a distant supply tank and assume that a pressure actuated switch is located in the water main at the pumping station so as to start and stop the pump in accordance with the pressure therein. Such control will obviously be unsatisfactory because every time a surge causes the pressure to increase appreciably at the point where said pressure switch is located, the pump, if running, will be stopped even though the water tank is not full. Similarly, whenever a surge causes the pressure to decrease appreciably at said pressure switch, the pump will be started regardless of the water level in the tank. The result will be repeated starting and stopping of the pump and inaccurate control of the water level in the tank.

The instant invention is based on the insight that pressure actuated switches can be employed to sense whenever the pressure in the main is above that corresponding to the desired maximum water level or below that corresponding to the desired minimum level; and said switches can be employed, not to actuate the pump directly, but rather to transmit signals to respective accumulating means which will in turn actuate the pump after a certain amount of said signals have, in effect, been accumulated.

Reference is made to FIG. 1 which is a graphical representation of the pressure that will typically exist within a water main if the system is properly controlled. The horizontal line X represents the amount of pressure which would be produced by the weight of the water in the supply tank when full, and the line Y represents the pressure corresponding to the desired minimum water level in said tank.

It will be noted from FIG. 1 that small variations in pressure will occur constantly. It will also be noted that very large variations in pressure caused by surges or impulses in the system will frequently occur so as to cause peaks in the pressure curve at $a$, $b$, $c$, $d$, $e$, $f$, etc. and valleys in said curve at $g$, $h$, $i$, $j$, $k$, $l$, etc. Let us assume that at the point $m$ on the curve the water level in the tank has decreased to the desired minimum level and the pump has been started. It will be readily understood that if the pressure sensitive control apparatus is actuated in accordance with the total pressure in the main and is not designed to analyze said pressure, then the pump will be stopped whenever peaks such as shown at points $c$, $d$, etc. occur, since those peak pressures greatly exceed that corresponding to the desired maximum water level. Similarly, whenever the low pressures such as shown at points $i$, $j$, etc. occur, the pump will be started. The point $n$ on the curve indicates the pressures which occur when the water level has reached or slightly exceeded the desired maximum level. It is at this time that the pump should be stopped. The point $p$ on the curve represents the point at which the water level in the tank has reached or dropped slightly below the desired minimum and at this point the pump should be again started.

As previously stated, this invention involves the use of pressure switches to transmit signals to accumulating means, a high pressure switch being employed to transmit a signal whenever the pressure in the water main is above the X pressure, and a low pressure switch being employed to transmit a signal whenever the pressure in the main drops below the Y pressure. Consequently, when a peak pressure occurs the pump is not necessarily started but rather a signal is sent to the accumulating means corresponding to the high pressure switch. Such a signal will produce an effect on the accumulating means but, according to the invention, said means are designed so that as soon as the pressure drops below the X pressure that effect will tend to be eliminated. Consequently, it is only when signals of sufficient frequency and duration are transmitted to said accumulating means that a predetermined cumulative effect will be produced so as to actuate said means and stop the pump. The apparatus of the instant invention is designed so that said cumulative effect will be produced when the water level has reached the maximum desired water level.

Similarly, according to the invention, a low pressure switch is employed to transmit signals to accumulating means associated therewith; but again it is only when signals of sufficient frequency and duration are transmitted to said accumulating means that a predetermined cumulative effect will be produced so as to actuate said means and start the pump. The apparatus of the invention is also designed so that the latter cumulative effect will be produced only when the water level has reached the desired minimum level.

A particular embodiment of my invention will now be described and for this purpose reference is made to FIG. 2. Four terminals 25 are shown to represent a standard 110/220/440 volt 60 cycle A.C. power source. Leads 26 and 27 are connected to the secondary of a transformer 28 at the points 29 and 30 respectively, said transformer being designed to produce 110 volts on its secondary. A pair of fuses 31 and 32 are placed in the leads 26 and 27. The leads 26 and 27 are connected to a rectifier 33 at terminals 34 and 35. Leads 36 and 37 are connected to terminals 38 and 39 of said rectifier so as to comprise part of a direct current circuit.

Between the points 40 and 41 in said direct current circuit there are placed a resistor 42, a low pressure switch 43, a condenser 44, a charging condenser 45, a coil 46($a$), a resistor 47 and a contact 48($c$). In a similar manner and in parallel to the above elements, there are placed between the points 49 and 50 in said direct current circuit a resistor 51, a high pressure switch 52, a condenser 53, a charging condenser 54, a coil 55($b$), a resistor 56 and a contact 57($c$).

The pump circuit, which is completely isolated from the control circuit described above, is represented by the lead 58 which has a contact 59($c$) provided therein.

The low pressure switch 43 is arranged to close whenever the pressure in the water main falls below that corresponding to the desired minimum water level in the tank. This switch is of a standard type having a bellows containing air which is connected to the water main so as to expand and contract in accordance with the water pressure, an associated electrical contact being opened and closed in accordance with the degree of expansion of said bellows. Such pressure actuated switches are well known to those skilled in the art and a further description thereof is not believed necessary except to note that for use in this invention it is desirable that they have as small a differential as possible, i.e., said switches should be open at all pressures above a predetermined pressure and closed at all pressures below said predetermined pressure. The high pressure switch 52 is identical to the switch 43 except that it is arranged to close whenever the pressure in the water main rises above that which would be produced by the weight of water in the supply tank when said tank is full.

Reference is next made to FIG. 3 which illustrates the manner in which said pressure switches can be connected to a water main. The tube 60 may, for example, be a ¼ inch copper tube. The adjusting screws 61 and 62 are of the type provided on any standard pressure switch to permit adjustment of the pressure which will cause the switches to open and close.

Referring again to FIG. 2, it will now be understood that whenever the pressure in the water main is below that corresponding to the desired minimum water level in the tank, direct current will be applied to the charging condenser 45 so as to charge said condenser. When the charging condenser 45 has been charged to a predetermined amount, e.g. 90 volts, then the coil 46(a) will be energized. In other words, the coil 46(a) is designed to be energized by a voltage of 90 volts and thus it will be energized when a charge of that amount has accumulated on the charging condenser 45. In the embodiment being described the condenser 45, together with the coil 46(a), comprises one of the accumulating means referred to hereinbefore.

When the coil 46(a) is energized, an associated contact 63(a) in the A.C. circuit is closed. The closing of this contact completes an A.C. circuit comprising leads 27, 64, 65, 66 and 26 so as to effect the energization of a coil 67(c) which is placed in said circuit. Similarly, the energization of coil 67(c) causes the contacts associated with that coil, namely, contacts 48(c), 57(c), 59(c) and 68(c) to be moved to their alternate positions. Consequently, the following sequence of operations will occur: the contact 48(c) will be opened so as to take the elements between the points 40 and 41 out of the D.C. circuit; the contact 57(c) will be closed so as to permit the charging of the condenser 54 whenever the high pressure switch 52 is closed; the coil 46(a) will be deenergized and the contact 63(a) will be again opened, due to the opening of 48(c); the contact 68(c) will be closed so as to maintain a complete A.C. circuit through the coil 67(c); and the contact 59(c) in the pump circuit will be closed so as to start the pump running. Thus, the pump (not shown) will have been started and the high pressure elements of the control circuit between the points 49 and 50 will have been placed in control of the system. As stated above, the embodiment being described is designed so that only one of the contacts 48(c) and 57(c) is closed at any one time; but this is merely a matter of practical design and is not a necessary feature of the invention.

It should be noted that the resistance 42 is provided so as to control the rate at which the charging condenser 45 is charged. The embodiment being described is so designed that if the pressure switch 43 were held closed it would take approximately one minute of constant charging to produce a charge of 90 volts on the condenser 45 and thus energize coil 46(a). The condenser 44 is provided to protect the contacts on the low pressure switch 43. In other words, when said switch is opened there is a tendency for the surrounding air to ionize and form an arc which will burn said contacts, but the condenser 44 will protect them by absorbing the charge which is produced.

It is an important feature of this invention that the effect produced on the accumulating means, in this embodiment the charge on condenser 45, be reduced whenever the pressure switch 43 is open. Obviously, the embodiment being described satisfies this requirement since the condenser 45 will discharge through the resistor 47 whenever switch 43 is open.

Reference is again made to FIGS. 1 and 2 and it will be assumed that the pump is off and the contact 48(c) is closed. It will now be understood that due to pulses or surges in the water main the pressure therein will continually first rise above and then fall below that pressure corresponding to the desired minimum water level in the tank, namely the Y pressure in FIG. 1, and thus the contacts of the pressure switch 43 will be opening and closing at a rapid rate. However, as long as the water level is substantially above the desired minimum, the pressure will exceed the Y pressure more often than it will fall below said Y pressure, despite great pressure variations caused by surges in the system. Consequently, the pressure switch will be open more often than it is closed and any charge produced on the condenser 45 by low pressures, such as at the point k in FIG. 1, will subsequently be discharged so that no cumulative effect will be produced on the condenser 45. When the water level in the tank closely approaches the desired minimum the pressure switch 43 will be closed more frequently and for longer periods of time until finally a 90 volt charge will be accumulated on said condenser 45 and the pump will be started.

It has been found that greater accuracy will be achieved if it becomes somewhat more difficult to increase the effect on the accumulating means as the water level approaches the desired minimum. Of course, the condenser 45 satisfies this object since it will charge slower and discharge faster as the accumulated charge thereon approaches more closely the critical 90 volts.

The operation of the elements between the points 49 and 50 in the control circuit, whereby the pump is turned off when the desired maximum water level is reached, is substantially identical to that of the low pressure control elements hereinbefore described. As previously stated, once the pump is started the contact 57(c) is closed and thus whenever the pressure in the water main exceeds that corresponding to the desired maximum level, the high pressure switch 52 will close so as to charge condenser 54. The resistance 51 controls the rate of charging of said condenser 54 and the condenser 53 is provided to protect the contacts on the pressure switch 52. Also, when the charging condenser 54 discharges, it discharges substantially entirely through the resistance 56 which controls the rate of such discharge.

When the water level in the tank closely approaches the desired maximum, the switch 52 will be closed more often than it is open and a charge of 90 volts will be accumulated on condenser 54 so as to energize coil 55(b) which is designed to be energized by such a voltage. When the latter coil is energized, an associated contact 69(b) in the A.C. circuit will be opened so as to deenergize the coil 67(c). When coil 67(c) is deenergized the following sequence of operations takes place: contact 68(c) is again opened; contact 59(c) in the pump circuit is opened so as to shut down the pump; contact 57(c) is opened so as to take the elements between the points 49 and 50 out of the D.C. circuit; and the contact 48(c) is again closed so that the elements between 40 and 41 are again put in control of the system.

A three position selector 70 is provided for control of associated contacts 71, 72 and 73. As shown in FIG. 2, the selector is in the automatic position so that control of the pump is automatic as described above. When said selector is placed in the off position the contacts 71, 72 and 73 are all opened and the entire system is disconnected. And when said selector 70 is placed in the manual position, the contacts 71 and 73 will be opened and the contact 72 will be closed so as to complete the A.C. circuit, maintain the coil 67(c) energized, and maintain the contact 59(c) in the pump circuit closed so as to effect continuous operation of the pump.

It will now be understood that while the elements 43 and 52 may be standard pressure switches (as long as they have a very small differential), yet they are employed in conjunction with a source of voltage to transmit dots or impulses of current to the condensers 45 and 54 respectively. Because of the purpose which they serve it is believed more suitable to describe them as signal generators and they will be so described hereinafter and in the appended claims.

Figure 4:
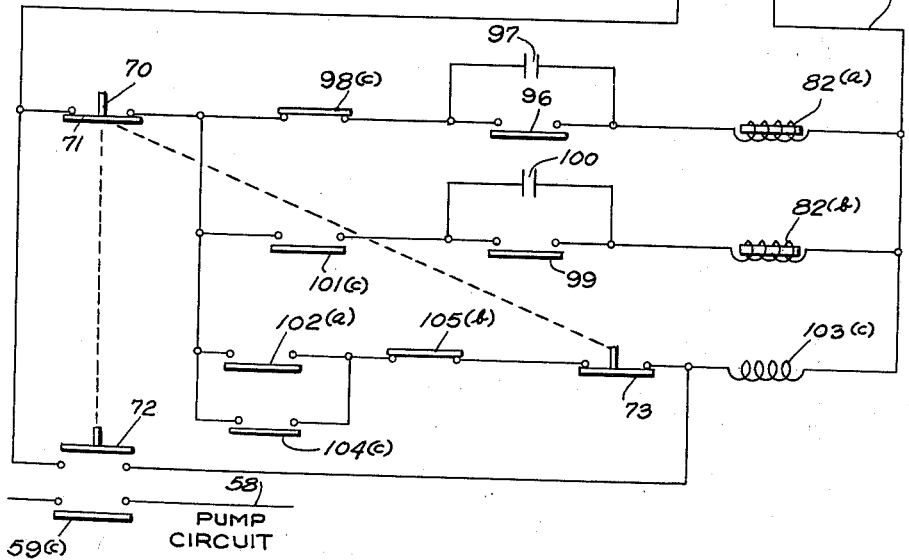
FIG. 4 is a schematic wiring diagram illustrating an alternative embodiment of the invention.

Reference is now made to FIG. 4 which illustrates an alternative embodiment of my invention. Four terminals 74 are shown to represent a standard 110/220/440 volt 60 cycle A.C. power source. Leads 75 and 76 are connected to the secondary of a transformer 77 at the points 78 and 79 respectively, said transformer being designed to produce 110 volts on its secondary. A pair of fuses 80 and 81 are placed in the leads 75 and 76. In this embodiment only A.C. current is employed. The principal distinguishing feature of this particular embodiment is the use of hydraulic relays 82(a) and 82(b) to replace the charging condensers 45 and 54 and the coils 46(a) and 55(b) of FIG. 2.

Figure 5:
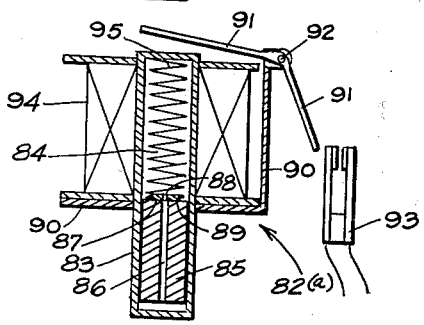
FIG. 5 is an elevational view, partly in section, illustrating one of the hydraulic relays employed in the embodiment of FIG. 4.

Reference is made to FIG. 5 which illustrates the construction of the hydraulic relay 82(a). A tube 83, made of brass or other non-magnetic material, is substantially filled with a liquid 84 such as silicone oil. A piston 85 made of a magnetic material, e.g. iron, is sealed within said tube so as to be free to move vertically therein. An orifice 86 is provided in the piston 85 so that any vertical movement of said piston within the tube 83 will be controlled by the flow of the oil 84 through said orifice. A flap valve 87 having an orifice 88 therein is provided at the upper end of the piston 85, the orifice 88 being made smaller than the orifice 86. When the piston 85 is moved upwardly the oil flows through the smaller orifice 88 whereas when said piston is moved downwardly the flap valve 87 will be pivoted upwardly about a pin 89 so that the oil need flow only through the larger orifice 86. In this manner, the piston 85 is designed to descend at a more rapid rate than it will ascend.

A steel backing 90 is affixed to the tube 83 by any suitable means and a steel armature lever 91 is pivotally mounted on the backing 90 by means of a pin 92, said lever being biased to its clockwise position (as shown in FIG. 5) by means of a spring (not shown). A switch 93 is arranged to cooperate with the lever 91 in such a manner that said switch will be closed when the lever 91 is moved to its counterclockwise position.

A coil 94 is wound around the upper end of the tube 83 so that if current is supplied to said coil the piston 85 will be drawn upwardly within the tube 83, the rate of ascent being controlled by the flow of the oil through orifice 88. A compression spring 95 is provided between the piston 85 and the upper end of the tube 83 so that the more closely the piston 85 approaches the upper end of the tube, the more difficult its upward movement will become. When current is supplied to the coil 94 the piston is gradually drawn upwardly and when the flow of current is stopped the piston will descend within the tube, the rate of descent being more rapid than the rate of ascent and being controlled by the flow of the oil 84 through the orifice 86.

In this embodiment the hydraulic relay 82(a) is designed so that if current were supplied constantly to the coil 94 it would require one minute for the piston to be drawn to the top of the tube 83. When the piston does reach the top of said tube, a magnetic circuit which comprises the steel backing 90 and the piston 85 is completed, and that end of the armature lever 91 which surmounts the top of said tube is quickly drawn thereto so as to effect the closing of the switch 93. Because the tube 83 itself is non-magnetic, no magnetic circuit can be completed and thus there will not be a concentrated field of force sufficient to pull in the armature lever 91 until such time as the magnetic piston 85 reaches the upper end of said tube.

The relay 82(a) has been described in detail because of its importance in this embodiment of the invention. However, such relays are well known to those skilled in the art and are normally used in electrical circuits to provide a predetermined time delay. It will now be understood that in the instant embodiment of my invention, hydraulic relays serve as the aforementioned accumulating means and the dots or impulses of current from the two signal generators are applied, respectively, to the coils of corresponding hydraulic relays of the type described.

Referring again to FIG. 4, the low pressure portion of the control circuit which serves to start the pump comprises a signal generator 96, a condenser 97 which serves to prevent the burning of the contacts on said generator, a hydraulic relay 82(a) and a contact 98(c). Similarly, the high pressure portion of the control circuit which serves to shut off the pump comprises a signal generator 99, a condenser 100, a hydraulic relay 82(b) and a contact 101(c).

When the pump is shut down the contact 98(c) will be closed and whenever the pressure in the water main falls below the Y pressure (see FIG. 1) the signal generator 96 will cause current to flow through the coil 94 (see FIG. 5) of the hydraulic relay 82(a) and the piston 85 will be caused to move upwardly. When the pressure in the water main again rises above the Y pressure, the piston 85 will be permitted to descend towards its original position. Consequently, low pressures such as shown at g, h, etc. in FIG. 1 will cause some upward movement of the piston 85, but will not effect the starting of the pump.

When the water level in the supply tank actually reaches the desired minimum level, the pressures in the main will be below the Y pressure more often than not, and thus the dots or impulses of current transmitted to the coil 94 will be of sufficient frequency and duration to cause the piston 85 to reach the top of the tube 83 so as to complete a magnetic circuit and effect the closing of the switch 93. When the relay 82(a) is actuated in this manner, an associated contact 102(a) will be closed causing A.C. current to be applied to a coil 103(c) so as to energize said coil.

The energization of the coil 103(c) causes associated contacts 98(c), 101(c), 104(c) and 59(c) to be moved to the positions opposite to those shown in FIG. 4. Thus, contact 59(c) in the pump circuit 58 will be closed so as to start the pump; contact 98(c) will be opened disconnecting the low pressure portion of the control circuit, deenergizing hydraulic relay 82(a) and again opening contact 102(a); contact 104(c) will be closed so as to maintain the energization of coil 103(c) and maintain the contact 59(c) in the pump circuit in its closed position, and contact 101(c) will be closed so as to place the high pressure elements of the control circuit in control of the pump.

After the pump has run a sufficient time to fill the supply tank to the desired maximum level, the hydraulic relay 82(b) will be actuated in the manner described hereinbefore so as to open an associated contact 105(b) and cause the following sequence of operations: the coil 103(c) will be deenergized; the contact 59(c) will be opened and the pump shut down; the contact 104(c) will be opened; the contact 101(c) will be opened so as to deenergize hydraulic relay 82(b) and again open contact 102(a); and the contact 98(c) will be closed so as to put the low pressure portion of the control circuit again in control of the pump.

It will now be understood that one of the most important features of the invention is the provision of accumulating means which are actuated by certain cumulative amounts of signals transmitted from corresponding signal generators and which progress toward their points of actuation when receiving signals and regress from said point when signals are not being transmitted. As previously stated, it is preferable that said regress be at a more rapid rate than said progress. It is also preferable that the rate of said progress decrease and the rate of said regress increase as the accumulating means closely approach their points of actuation so as to start or stop the pump.

In the embodiment of FIG. 2 charging condensers were described as the accumulating means and in the embodiment of FIG. 4 hydraulic relays were described. While both said condensers and said relays will give excellent results, it will be readily evident that various other types of accumulating means could be employed in the practice of my invention and that the specific means described herein are merely illustrative. For example, one could employ a pair of thermostatic time delay tubes whereby the signals from the signal generators could be used to pulse and heat a filament which upon reaching a certain temperature would close a bi-metallic contact. As in the embodiments previously described, two signal generators would be employed and a corresponding time delay tube would be provided for each.

Referring to the example discussed earlier herein, assume that a 150,000 gallon water tank is 25 feet in height and that it is desired to control the water level therein. Ignoring surges in the system, a pressure in the water main of 10.8 p.s.i. would correspond to a full tank and a pressure of 10.59 p.s.i. would indicate that the water level had dropped six inches. A six inch drop would, of course, correspond to a loss of 2500 gallons. If the desired minimum water level were 24.5 feet, then in order to control the system the low pressure signal generator 43 (see FIG. 2) would be set at 10.59 p.s.i. (corresponding to the Y pressure in FIG. 1) and the high pressure signal generator 52 would be set at 10.8 p.s.i. (corresponding to the X pressure in FIG. 1). The instant invention will readily provide control of this nature even though surges or impulses of 5 to 50 p.s.i. be present in the system. Consequently, the instant invention is believed to provide significant advantages over those detecting mechanisms which detect surges as either high pressures or low pressures and respond by causing rapid connecting and disconnecting of the pump motor so as to short cycle the pump.

In controlling the level of a fluid by the instant invention, it will be understood that the signal generators e.g. 43 and 52 in FIG. 2, must be connected to the fluid system at a point substantially below the surface of the fluid. In controlling the level of water in a supply tank located a considerable distance from the pump, these generators are preferably connected to the water main at the pumping station as shown in FIG. 3. If the level of a pond or lake were being controlled the signal generators could simply be dropped to the bottom of said pond or lake. In this latter application the instant invention has an obvious advantage over devices which operate near the surface of the water so as to be subject to the hazards of ice formation.

One of the most important advantages of the instant invention lies in its simplicity and in the fact that it is quite inexpensive to manufacture and install.

This invention can, of course, be applied in various ways and the present description should, therefore, be regarded as disclosing only an illustrative embodiment of the invention from which no unnecessary limitations should be implied.

I claim:

1. An automatic pressure analyzing apparatus for use in controlling a fluid level, comprising: an electrical power source; first signal generating means associated with said power source and connected to said fluid for generating a signal whenever the pressure at its point of connection is below a predetermined minimum amount; second signal generating means associated with said power source and connected to said fluid for generating a signal whenever the pressure at its point of connection is above a predetermined maximum amount; first accumulating means associated with said first signal generating means which is actuated by a predetermined cumulative amount of the signals therefrom and which progresses towards its point of actuation when said signals are being generated and which regresses from said point when said signals are not being generated; second accumulating means associated with said second signal generating means which is actuated by a predetermined cumulative amount of the signals therefrom and which progresses towards its point of actuation when said signals are being generated and which regresses from said point when said signals are not being generated; and fluid level control means responsive to the actuation of said first and second accumulating means for limiting the variation of the level of said fluid to a predetermined maximum amount; the signals generated by said signal generating means being electrical signals and said accumulating means being electrical means actuated by a predominance of signals determined by pressures of the aforesaid predetermined amounts, respectively, resulting from the actual fluid level, even though there may be constant surging of the fluid, and being thereby caused to progress to their respective actuating points.

2. An automatic pressure analyzing apparatus for use in controlling a fluid level, comprising: an electrical power source; first signal generating means associated with said power source and submerged in said fluid for generating a signal whenever the pressure at its depth is below a predetermined minimum amount; second signal generating means associated with said power source and submerged in said fluid for generating a signal whenever the pressure at its depth is above a predetermined maximum amount; first accumulating means associated with said first signal generating means which is actuated by a predetermined cumulative amount of the signals therefrom and which progresses towards its point of actuation when said signals are being generated and which regresses from said point when said signals are not being generated; second accumulating means associated with said second signal generating means which is actuated by a predetermined cumulative amount of the signals therefrom and which progresses towards its point of actuation when said signals are being generated and which regresses from said point when said signals are not being generated; and fluid level control means responsive to the actuation of said first and second accumulating means for limiting the variation of the level of said fluid to a predetermined maximum amount; the signals generated by said signal generating means being electrical signals and said accumulating means being electrical means actuated by a predominance of signals determined by pressures of the aforesaid predetermined amounts, respectively, resulting from the actual fluid level, even though there may be constant surging of the fluid, and being thereby caused to progress to their respective actuating points.

3. An automatic pressure analyzing apparatus for use in controlling a fluid level, comprising: an electrical power source; first signal generating means associated with said power source and connected to said fluid at a predetermined depth therein for generating a signal whenever the pressure at said depth is below that corresponding to the desired minimum fluid level; second signal generating means associated with said power source and connected to said fluid at said predetermined depth for generating a signal whenever the pressure at said depth is above that corresponding to the desired maximum fluid level; first accumulating means associated with said first signal generating means which is actuated by a predetermined cumulative amount of the signals therefrom and which progresses towards its point of actuation when said signals are being generated and which regresses from said point when said signals are not being generated; second accumulating means associated with said second signal generating means which is actuated by a predetermined cumulative amount of the signals therefrom and which progresses towards its point of actuation when said signals are being generated and which regresses from said point when said signals are not being generated; and fluid level control means responsive to the actuation of said first and second accumulating means for maintaining the level of said fluid between said desired minimum and said desired maximum levels; the signals generated by said signal generating means being electrical signals and said accumulating means being electrical means actuated by a predominance of signals determined by pressures of the aforesaid predetermined amounts, respectively, resulting from the actual fluid level, even though there may be constant surging of the fluid, and being thereby caused to progress to their respective actuating points.

4. An automatic pressure analyzing apparatus for use in controlling a fluid level, comprising: an electrical power source; first signal generating means associated with said power source and connected to said fluid for generating a signal whenever the pressure at its point of connection is below a predetermined minimum amount; second signal generating means associated with said power source and connected to said fluid for generating a signal whenever the pressure at its point of connection is above a predetermined maximum amount; first accumulating means associated with said first signal generating means which is actuated by a predetermined cumulative amount of the signals therefrom and which progresses towards its point of actuation when said signals are being generated and which regresses from said point when said signals are not being generated, said first accumulating means being of a type whereby the rate of progress decreases and the rate of regress increases as said point of actuation is approached; second accumulating means associated with said second signal generating means which is actuated by a predetermined cumulative amount of the signals therefrom and which progresses towards its point of actuation when said signals are being generated and which regresses from said point when said signals are not being generated, said second accumulating means being of a type whereby the rate of progress decreases and the rate of regress increases as said point of actuation is approached; and fluid level control means responsive to the actuation of said first and second accumulating means for limiting the variation of the level of said fluid to a predetermined maximum amount; the signals generated by said signal generating means being electrical signals and said accumulating means being electrical means actuated by a predominance of signals determined by pressures of the aforesaid predetermined amounts, respectively, resulting from the actual fluid level, even though there may be constant surging of the fluid, and being thereby caused to progress to their respective actuating points.

5. An automatic pressure analyzing apparatus for use in controlling a fluid level, comprising: an electrical power source; first signal generating means associated with said power source and connected to said fluid for generating a signal whenever the pressure at its point of connection is below a predetermined minimum amount; second signal generating means associated with said power source and connected to said fluid for generating a signal whenever the pressure at its point of connection is above a predetermined maximum amount; first accumulating means associated with said first signal generating means which is actuated by a predetermined cumulative amount of the signals therefrom and which progresses towards its point of actuation when said signals are being generated and which regresses from said point when said signals are not being generated; means for controlling the rate of progress and the rate of regress of said first accumulating means; second accumulating means associated with said second signal generating means which is actuated by a predetermined cumulative amount of the signals therefrom and which progresses towards its point of actuation when said signals are being generated and which regresses from said point when said signals are not being generated; means for controlling the rate of progress and the rate of regress of said second accumulating means; and fluid level control means responsive to the actuation of said first and second accumulating means for limiting the variation of the level of said fluid to a predetermined maximum amount; the signals generated by said signal generating means being electrical signals and said accumulating means being electrical means actuated by a predominance of signals determined by pressures by the aforesaid predetermined amounts, respectively, resulting from the actual fluid level, even though there may be constant surging of the fluid, and being thereby caused to progress to their respective actuating points.

6. An automatic pressure analyzing apparatus for use in controlling the water level in a water supply tank where said tank is located a considerable distance from the pump associated therewith and is connected thereto by a water main, comprising: an electrical power source; first signal generating means associated with said power source and connected to said water main in the proximity of said pump for generating a signal whenever the pressure in said main is below that corresponding to the desired minimum water level in said tank; second signal generating means associated with said power source and connected to said water main in the proximity of said pump for generating a signal whenever the pressure in said main is above that corresponding to the desired maximum water level in said tank; first accumulating means associated with said first signal generating means which is actuated by a predetermined cumulative amount of the signals therefrom and which progresses towards its point of actuation when said signals are being generated and which regresses from said point when said signals are not being generated; second accumulating means associated with said second signal generating means which is actuated by a predetermined cumulative amount of the signals therefrom and which progresses towards its point of actuation when said signals are being generated and which regresses from said point when said signals are not being generated; means responsive to the actuation of said first accumulating means for starting said pump; and means responsive to the actuation of said second accumulating means for stopping said pump whereby the water level in said supply tank will be maintained between said desired minimum and said desired maximum water levels; the signals generated by said signal generating means being electrical signals and said accumulating means being electrical means actuated by a predominance of signals determined by pressures of the aforesaid predetermined amounts, respectively, resulting from the actual fluid level, even though there may be constant surging of the fluid, and being thereby caused to progress to their respective actuating points.

7. An automatic pressure analyzing apparatus for use in controlling the water level in a water supply tank where said tank is located a considerable distance from the pump associated therewith and in connected thereto by a water main, comprising: an electrical power source; first signal generating means associated with said power source and connected to said water main in the proximity of said pump for generating a signal whenever the pressure in said main is below that corresponding to the desired minimum water level in said tank; second signal generating means associated with said power source and connected to said water main in the proximity of said pump for generating a signal whenever the pressure in said main is above that corresponding to the desired maximum water level in said tank; first accumulating means associated with said first signal generating means which is actuated by a predetermined cumulative amount of the signals therefrom and which progresses towards its point of actuation when said signals are being generated and which regresses from said point when said signals are not being generated; second accumulating means associated with said second signal generating means which is actuated by a predetermined cumulative amount of the signals therefrom and which progresses towards its point of actuation when said signals are being generated and which regresses from said point when said signals are not being generated; means responsive to the actuation of said first accumulating means for starting said pump; means responsive to the actuation of said second accumulating means for stopping said pump; means for disconnecting said first signal generating means from said power source when said pump is running; and means for disconnecting said second signal generating means from said power source when said pump is not running, whereby the water level in said supply tank will be maintained between said desired minimum and said desired maximum water levels; the signals generated by said signal generating means being electrical signals and said accumulating means being electrical means actuated by a predominance of signals determined by pressures of the aforesaid predetermined amounts, respectively, resulting from the actual fluid level, even though there may be constant surging of the fluid, and being thereby caused to progress to their respective actuating points.

8. An automatic pressure analyzing apparatus for use in controlling a fluid level, comprising: an electrical power source; a first pressure actuated signal generator associated with said power source and connected to said fluid for generating a signal whenever the pressure at its point of connection is below a predetermined minimum amount; a second pressure actuated signal generator associated with said power source and connected to said fluid for generating a signal whenever the pressure at its point of connection is above a predetermined maximum amount; a first charging condenser arranged to be charged by the signals generated by said first signal generator and arranged to discharge when said signals are not being generated; a first relay associated with said first charging condenser and arranged to be energized by a predetermined cumulative charge on said condenser; a second charging condenser arranged to be charged by the signals generated by said second signal generator and arranged to discharge when said signals are not being generated; a second relay associated with said second charging condenser and arranged to be energized by a predetermined cumulative charge on said condenser; and fluid level control means responsive to the energization of said relays for limiting the variation of the level of said fluid to a predetermined maximum amount; said charging condensers being charged, respectively, by a predominance of signals determined by pressures of the aforesaid predetermined amounts, respectively, resulting from actual fluid level, even though there may be constant surging of the fluid, and being thereby progressively charged to a predetermined point of discharge at which said relays, respectively, are energized.

9. An automatic pressure analyzing apparatus for use in controlling the water level in a water supply tank where said tank is located a considerable distance from the pump associated therewith and is connected thereto by a water main, comprising: a first pressure actuated signal generator associated with said power source and connected to said water main in the proximity of said pump for generating a signal whenever the pressure in said main is below that corresponding to the desired minimum water level in said tank; a second pressure actuated signal generator associated with said power source and connected to said water main in the proximity of said pump for generating a signal whenever the pressure in said main is above that corresponding to the desired maximum water level in said tank; a first charging condenser arranged to be charged by the signals generated by said first signal generator and arranged to discharge when said signals are not being generated; a first relay associated with said first charging condenser and arranged to be energized by a predetermined cumulative charge on said condenser; a second charging condenser arranged to be charged by the signals generated by said second signal generator and arranged to discharge when said signals are not being generated; a second relay associated with said second charging condenser and arranged to be energized by a predetermined cumulative charge on said condenser; means responsive to the energization of said first relay for starting said pump; and means responsive to the energization of said second relay for stopping said pump whereby the water level in said supply tank will be maintained between said desired minimum and said desired maximum water levels; said charging condensers being charged, respectively, by a predominance of signals determined by pressures of the aforesaid predetermined amounts, respectively, resulting from actual fluid level, even though there may be constant surging of the fluid, and being thereby progressively charged to a predetermined point of discharge at which said relays, respectively, are energized.

10. An automatic pressure analyzing apparatus of the type set forth in claim 9 including means for disconnecting said first signal generator from said power source when said pump is running and means for disconnecting said second signal generator from said power source when said pump is not running.

11. An automatic pressure analyzing apparatus for use in controlling a fluid level, comprising: an electrical power source; a first pressure actuated signal generator associated with said power source and connected to said fluid for generating a signal whenever the pressure at its point of connection is below a predetermined minimum amount; a second pressure actuated signal generator associated with said power source and connected to said fluid for generating a signal whenever the pressure at its point of connection is above a predetermined maximum amount; a first hydraulic relay associated with said first signal generator so as to receive the signals generated thereby and arranged to be energized by a predetermined cumulative amount of said signals; a second hydraulic relay associated with said second signal generator so as to receive the signals generated thereby and arranged to be energized by a predetermined cumulative amount of said signals; and fluid level control means responsive to the energization of said hydraulic relays for limiting the variation of the level of said fluid to a predetermined maximum amount.

12. An automatic pressure analyzing apparatus for use in controlling the water level in a water supply tank where said tank is located a considerable distance from the pump associated therewith and is connected thereto by a water main, comprising: a first pressure actuated signal generator associated with said power source and connected to said water main in the proximity of said pump for generating a signal whenever the pressure in said main is below that corresponding to the desired minimum water level in said tank; a second pressure actuated signal generator associated with said power source and connected to said water main in the proximity of said pump for generating a signal whenever the pressure in said main is above that corresponding to the desired maximum water level in said tank; a first hydraulic relay associated with said first signal generator so as to receive the signals generated thereby and arranged to be energized by a predetermined cumulative amount of said signals; a second hydraulic relay associated with said second signal generator so as to receive the signals generated thereby and arranged to be energized by a predetermined cumulative amount of said signals; means responsive to the energization of said first hydraulic relay for starting said pump; and means responsive to the energization of said second hydraulic relay for stopping said pump whereby the water level in said supply tank will be maintained between said desired minimum and said desired maximum water levels.

13. An automatic pressure analyzing apparatus of the type set forth in claim 12 including means for disconnecting said first signal generator from said power source when said pump is running and means for disconnecting said second signal generator from said power source when said pump is not running.

14. A method for controlling a fluid level comprising: measuring the pressure of said fluid at a predetermined depth therein so as to sense whenever said pressure is below a first predetermined pressure corresponding to a desired minimum fluid level and whenever said pressure is above a second predetermined pressure corresponding to a desired maximum fluid level; producing a first signal whenever said pressure is below said first predetermined pressure; producing a second signal whenever said pressure is above said second predetermined pressure; sensing the duration and frequency of said first signals so as to determine approximately when said pressure is consistently below said first predetermined pressure more often than not; sensing the duration and frequency of said second signals so as to determine approximately when said pressure is consistently above said second predetermined pressure more often than not; and increasing the level of said fluid when said pressure is consistently below said first predetermined pressure more often than not irrespective of any surging of the fluid and continuing to increase said level until said pressure is consistently above said second predetermined pressure more often than not irrespective of any surging of the fluid whereby the level of said fluid will be maintained between said desired minimum and said desired maximum fluid levels.

15. A method for controlling the water level in a water supply tank where said tank is located a considerable distance from a pump associated therewith and is connected thereto by a water main, comprising: measuring the pressure in said water main at a point in the proximity of said pump so as to sense whenever said pressure is below a first predetermined pressure corresponding to a desired minimum water level in the tank and so as to sense whenever said pressure is above a second predetermined pressure corresponding to a desired maximum water level in the tank; producing a first signal whenever said pressure is below said first predetermined pressure; producing a second signal whenever said pressure is above said second predetermined pressure; sensing the duration and frequency of said first signals so as to determine approximately when said pressure is consistently below said first predetermined pressure more often than not; sensing the duration and frequency of said second signals so as to determine approximately when said pressure is consistently above said second predetermined pressure more often than not; starting said pump when said pressure is consistently below said first predetermined pressure more often than not irrespective of any surging of the fluid; and stopping said pump when said pressure is consistently above said second predetermined pressure more often than not irrespective of any surging of the fluid whereby the level of the water in said tank will be maintained between said desired minimum and said desired maximum water levels.

16. An automatic pressure analyzing apparatus for use in controlling the water level in a water supply tank where said tank is located a considerable distance from the pump associated therewith and is connected thereto by a water main, comprising: an electrical power source; pressure-responsive signal generating means associated with said power source and connected to said water main in the proximity of said pump for generating signals the magnitude of which is dependent upon the water pressure in said main; at least two accumulating means electrically connected to said signal generating means and adapted to be actuated by a predetermined cumulative amount of the signals therefrom; and means for starting and stopping said pump, said means being connected to each of said accumulating means so as to be controlled thereby, one of said accumulating means being adapted to control starting of the pump and the other to control the stopping thereof, whereby the water level in said water supply tank will be controlled in accordance with a continuous analysis of the water pressure in the main at a point located a considerable distance from said tank; the signals generated by said signal generating means being electrical signals and said accumulating means being electrical means actuated by a predominance of signals determined by pressures of the aforesaid predetermined amounts, respectively, resulting from the actual fluid level, even though there may be constant surging of the fluid, and being thereby caused to progress to their respective actuating points.

References Cited in the file of this patent

UNITED STATES PATENTS

| | | |
|---|---|---|
| 1,913,557 | Millar | June 13, 1933 |
| 1,972,986 | Gardeen | Sept. 11, 1934 |
| 1,981,160 | Baldwin | Nov. 20, 1934 |
| 2,072,425 | Eggleston | Mar. 2, 1937 |
| 2,275,066 | Otterbourg | Mar. 3, 1942 |
| 2,430,775 | Marchese | Nov. 11, 1947 |
| 2,440,981 | Smith | May 4, 1948 |
| 2,884,001 | Herrero | Apr. 28, 1959 |